United States Patent
Wang et al.

(10) Patent No.: US 10,650,259 B2
(45) Date of Patent: May 12, 2020

(54) HUMAN FACE RECOGNITION METHOD AND RECOGNITION SYSTEM BASED ON LIP MOVEMENT INFORMATION AND VOICE INFORMATION

(71) Applicant: Tencent Technology (Shenzhen) Company Limited, Shenzhen (CN)

(72) Inventors: Chengjie Wang, Shenzhen (CN); Jilin Li, Shenzhen (CN); Hui Ni, Shenzhen (CN); Yongjian Wu, Shenzhen (CN); Feiyue Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 224 days.

(21) Appl. No.: 15/644,043

(22) Filed: Jul. 7, 2017

(65) Prior Publication Data
US 2017/0308739 A1    Oct. 26, 2017

Related U.S. Application Data

(63) Continuation of application No. PCT/CN2016/081170, filed on May 5, 2016.

(30) Foreign Application Priority Data

Jun. 11, 2015   (CN) .......................... 2015 1 0319470

(51) Int. Cl.
    *G06K 9/00*   (2006.01)
    *G06F 21/32*  (2013.01)
    *G10L 15/25*  (2013.01)
(52) U.S. Cl.
    CPC ......... *G06K 9/00899* (2013.01); *G06F 21/32* (2013.01); *G06K 9/00288* (2013.01); *G10L 15/25* (2013.01)

(58) Field of Classification Search
    None
    See application file for complete search history.

(56) References Cited

U.S. PATENT DOCUMENTS

2010/0158319 A1    6/2010  Jung
2016/0342851 A1*  11/2016  Holz ................. G06K 9/00906

FOREIGN PATENT DOCUMENTS

CN    103886301 A    6/2014
CN    104361276 A    2/2015
(Continued)

OTHER PUBLICATIONS

International Search Report for corresponding application PCT/CN2016/081170 filed on May 5, 2016; dated Jun. 28, 2016.

*Primary Examiner* — Justin P. Misleh
(74) *Attorney, Agent, or Firm* — Anova Law Group, PLLC (57) ABSTRACT

The embodiment of the present invention provides a human face recognition method and recognition system. The method includes that: a human face recognition request is acquired, and a statement is randomly generated according to the human face recognition request; audio data and video data returned by a user in response to the statement are acquired; corresponding voice information is acquired according to the audio data; corresponding lip movement information is acquired according to the video data; and when the lip movement information and the voice information satisfy a preset rule, the human face recognition request is permitted. By performing fit goodness matching between the lip movement information and voice information in a video for dynamic human face recognition, an attack by human face recognition with a real photo may be effectively avoided, and higher security is achieved.

18 Claims, 4 Drawing Sheets

(56) References Cited

FOREIGN PATENT DOCUMENTS

| | | | | |
|---|---|---|---|---|
| CN | 104376250 | A | | 2/2015 |
| CN | 104598796 | A | * | 5/2015 |
| CN | 104598796 | A | | 5/2015 |
| CN | 104683302 | A | | 6/2015 |
| CN | 104951730 | A | | 9/2015 |
| CN | 104966053 | A | | 10/2015 |
| EP | 2562746 | A1 | | 2/2013 |

* cited by examiner

HUMAN FACE RECOGNITION METHOD AND RECOGNITION SYSTEM BASED ON LIP MOVEMENT INFORMATION AND VOICE INFORMATION

CROSS REFERENCE TO RELATED APPLICATIONS

This application is a continuation of International Patent Application No. PCT/CN2016/081170 filed on May 5, 2016 which claims priority to Chinese Patent Application No. 201510319470.9, filed on Jun. 11, 2015, the entire contents of which said applications are incorporated herein by reference.

TECHNICAL FIELD

The disclosure belongs to the field of network security, and particularly relates to a human face recognition method and recognition system.

BACKGROUND

A human face recognition system usually refers to a computer technology for performing identity authentication by analyzing and comparing visual feature information of a human face, and belongs to a scope of a biometric feature recognition technology. Compared with a conventional recognition manner of key recognition, radio frequency signal recognition, Bluetooth recognition and the like, a human face recognition system has the advantages of portability, low change rate and low loss rate.

However, along with popularization and application of a human face recognition system, more and more image counterfeiting attack methods successively appear. For example, a real photo of a user is counterfeited for attacking. These attack methods cause vulnerability and low security of a human face recognition system.

SUMMARY

In view of this, a purpose of the embodiment of the present invention is to provide a human face recognition method and recognition system, which may solve the technical problem of low security caused by difficulty in distinguishing a real person and a photo and vulnerability in a conventional art.

In order to solve the abovementioned technical problem, the embodiment of the present invention provides a human face recognition method, wherein the method includes:

acquiring a human face recognition request, and randomly generating a statement according to the human face recognition request;

acquiring audio data and video data returned by a user in response to the statement;

acquiring corresponding voice information according to the audio data;

acquiring corresponding lip movement information according to the video data; and when the lip movement information and the voice information satisfy a preset rule, permitting the human face recognition request.

In order to solve the abovementioned technical problem, the embodiment of the present invention provides a human face recognition system, wherein the system includes:

a statement generation module, configured to acquire a human face recognition request, and randomly generate a statement according to the human face recognition request;

a response acquisition module, configured to acquire audio data and video data returned by a user in response to the statement;

a voice acquisition module, configured to acquire corresponding voice information according to the audio data;

a lip movement acquisition module, configured to acquire corresponding lip movement information according to the video data;

a fit goodness judgment module, configured to judge whether the lip movement information and the voice information satisfy a preset rule or not; and a request response module, configured to when the lip movement information and the voice information satisfy the preset rule, permit the human face recognition request.

Compared with the conventional art, the human face recognition method and recognition system of the embodiment of the present invention have the advantages that extraction and fit goodness matching are performed on the lip movement information and voice information in a video respectively to implement dynamic human face recognition, so that a behavior of performing human face recognition for attacking by adopting a real photo may be effectively avoided, and higher security is achieved.

DESCRIPTION OF EMBODIMENTS

Referring to patterns in the drawings where the same component symbols represent the same components, a principle of the embodiment of the invention is described with implementation in a proper computing environment as an example. Specific embodiments of the embodiment of the invention are described below on the basis of examples, and should not be considered as limits to other undetailed specific embodiments of the embodiment of the invention.

Text descriptions made above about the principle of the embodiment of the invention are not intended to represent a limit, and those skilled in the art may know that multiple steps and operations mentioned below may also be implemented in hardware. The principle of the embodiment of the invention is operated by virtue of many other general-purpose or specific-purpose computing and communication environments or configurations.

Figure 1:
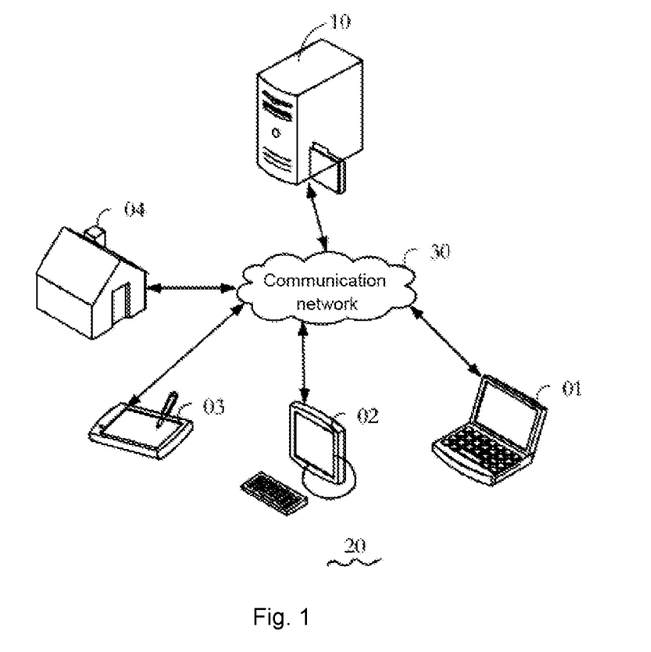
FIG. 1 is a schematic diagram of an application environment of a human face recognition method and recognition system according to an embodiment of the present invention.

FIG. 1 is a schematic diagram of an application environment of a human face recognition method and recognition system according to an embodiment of the present invention. The application environment includes a human face recognition server 10, a human face recognition system 20 and a communication network 30.

The human face recognition server 10 is configured to randomly generate a statement as an authentication rule, and send the statement to the human face recognition system for authentication.

Wherein, the statement is usually a combination of characters, words and/or phonetic letters, and a content of the statement is displayed in a form of character, picture or voice.

It can be understood that the human face recognition server 10 updates the statement at a preset time interval to avoid an authentication video of a user being secretly recorded for attacking.

The human face recognition system 20 may be downloaded and installed in various types of recognition terminals, for example, a notebook computer 01, a desktop computer 02, an intelligent mobile phone 03 or an access control system 04.

It can be understood that: the human face recognition system 20 performs human face recognition according to the authentication rule sent by the human face recognition server 10, and enables a corresponding right after human face recognition is completed.

The communication network 30 is connected between the human face recognition system 20 and the human face recognition server 10, and includes a wireless network and a wired network, wherein the wireless network includes one or a combination of multiple of a wireless wide area network, a wireless local area network, a wireless metropolitan area network and a wireless personal area network.

The solution may be applied to human face recognition system-based independent, assistant or complementary human face recognition. Referring to the following multiple embodiments, embodiment 1 focuses on basic steps of the human face recognition method, embodiment 2 focuses on optimal steps of the human face recognition method, and embodiment 3 focuses on an optical schematic diagram of modules of the human face recognition system. It can be understood that: although focuses of each embodiment are different, their design concept is consistent. Moreover, undetailed parts in a certain embodiment may refer to detailed descriptions of the whole specification, and will not be elaborated.

Embodiment 1

Figure 2:
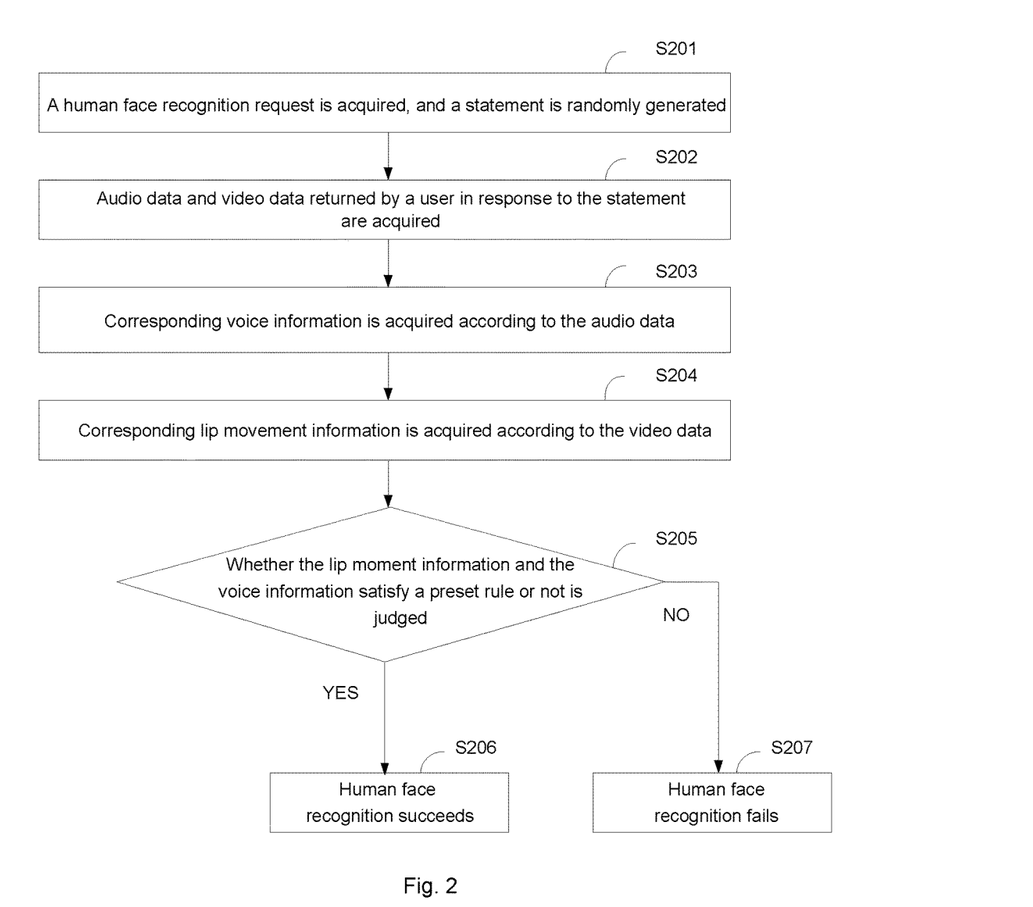
FIG. 2 is a schematic diagram of a working flow of a human face recognition method according to embodiment 1 of the present invention.

FIG. 2 is a flowchart of a human face recognition method according to an embodiment of the present invention. The human face recognition method is applied to various kinds of recognition terminal devices.

In Step S201, a human face recognition request is acquired, and a statement is randomly generated according to the human face recognition request.

Specifically, the generation step includes that: (1) the human face recognition request is acquired; (2) a response is given to the human face recognition request to randomly generate the statement on the basis of a preset statement generation rule; and (3) a content of the statement is displayed in a form of character, picture or voice.

Wherein, Step (2) may also be replaced with that: a latest statement randomly generated by a server is acquired from the server according to the human face recognition request, wherein the statement in the server is automatically updated at a preset time interval, and a probability of attacks caused by secret recording of video data may be reduced by shortening the preset time interval.

Adoption of multiple forms of character, picture, voice and the like for displaying may also prevent adoption of a machine recognition manner for attacking.

In Step S202, audio data and video data returned by a user in response to the statement are acquired.

Wherein, before the acquisition step, the method also includes: a step that a face, particularly lips, of the user is positioned, so as to ensure accuracy of the video data.

In Step S203, corresponding voice information is acquired according to the audio data.

In Step S204, corresponding lip movement information is acquired according to the video data.

In Step S205, whether the lip moment information and the voice information satisfy a preset rule or not is judged.

Wherein, the judgment step is specifically implemented as follows:

(1) the preset rule is set, including a fit goodness threshold value;

(2) whether fit goodness between the lip movement information and the voice information is higher than the fit goodness threshold value or not is judged; and (3) when the fit goodness between the lip movement information and the voice information is higher than the fit goodness threshold value, the human face recognition request is permitted.

The fit goodness threshold value may be a percentage of an overlapped length of a voice interval and a lip movement interval in the whole video length.

In Step S206, when the lip movement information and the voice information satisfy the preset rule, the human face recognition request is permitted.

In Step S207, when the lip movement information and the voice information satisfy the preset rule, the human face recognition request is denied, that is, human face recognition fails.

Wherein, the fit goodness threshold value is usually 60%~90%, and is preferably about 75%. If the fit goodness threshold value is set to be excessively high, a memory may be excessively consumed in a recognition analysis step, and if it is set to be too low, an analysis result is inaccurate. Therefore, selecting a proper interval may achieve double recognition effects with half work.

According to the human face recognition method of the embodiment of the present invention, fit goodness matching is performed on the lip movement information and voice information in a video for dynamic human face recognition, so that an attack made by human face recognition with a real photo may be effectively avoided, and higher security is achieved.

In an alternative embodiment, above human face recognition method is performed at an apparatus having one or more processors and one or more memories for storing instructions to be executed by the one or more processors. The instructions, when executed by the one or more processors, cause the one or more processors to perform above method.

Embodiment 2

Figure 3:
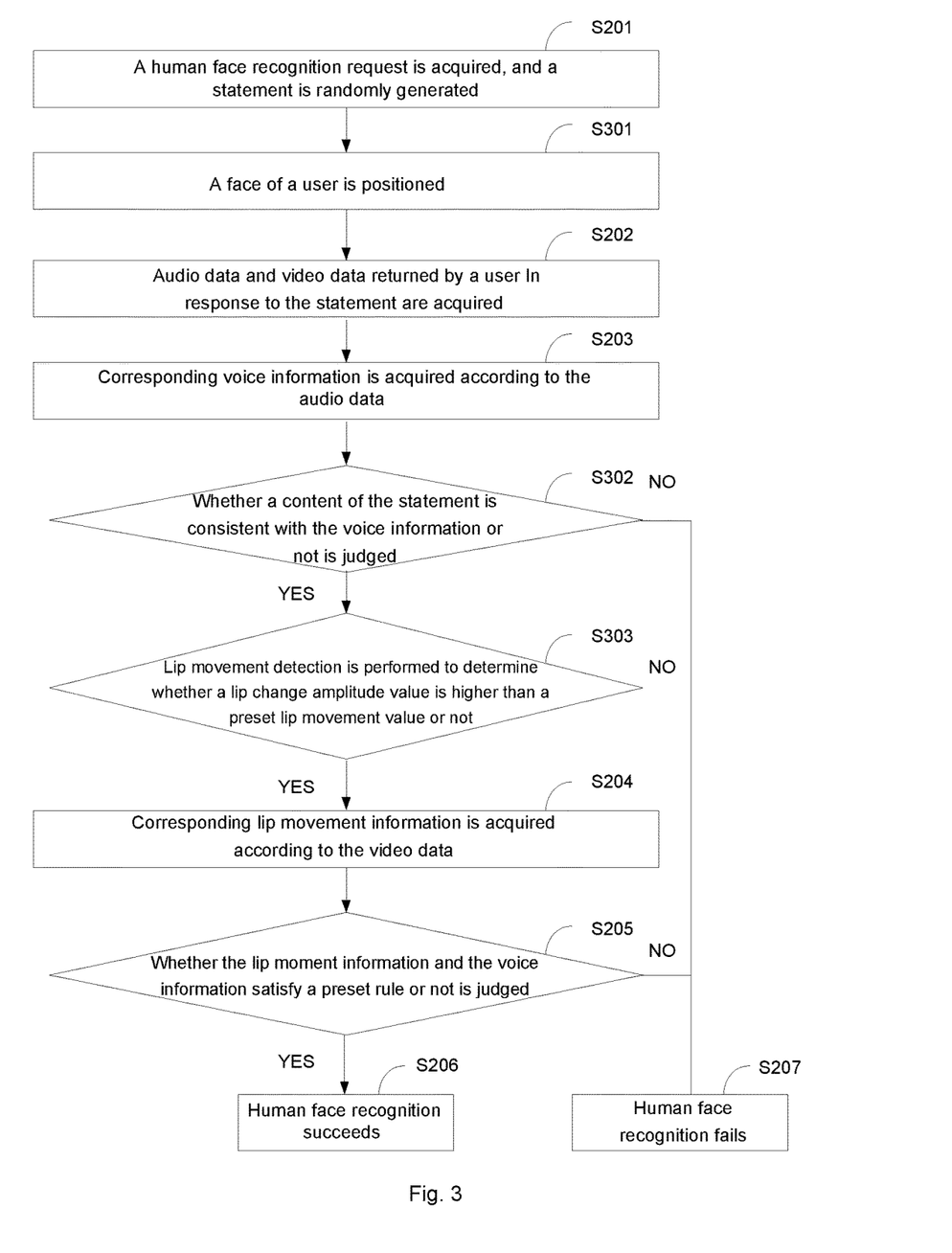
FIG. 3 is a schematic diagram of a working flow of a human face recognition method according to embodiment 2 of the present invention.

FIG. 3 is a flowchart of a human face recognition method according to an embodiment of the present invention. The human face recognition method is applied to various kinds of recognition terminal devices.

Wherein, the human face recognition method shown in FIG. 3 optimizes basic steps of a human face recognition method shown in FIG. 2. Wherein, in order to better distinguish the basic steps from optimal steps, steps the same as those in FIG. 2 in FIG. 3 are numbered by adopting S20 as basic steps, and steps different from those in FIG. 2 in FIG. 3 are numbered by adopting S30 as optimal steps.

In Step S201, a human face recognition request is acquired, and a statement is randomly generated according to the human face recognition request.

Specifically, the generation step includes that:

(1) the human face recognition request is acquired; (2) a response is given to the human face recognition request to randomly generate the statement on the basis of a preset statement generation rule; and (3) a content of the statement is displayed in a form of character, picture or voice, wherein the statement is a combination of characters, words, and/or phonetic letters.

Wherein, Step (2) may also be replaced with that: a latest statement randomly generated by a server is acquired from the server according to the human face recognition request, wherein the statement in the server is automatically updated at a preset time interval, and a probability of attacks caused by secret recording of video data may be reduced by shortening the preset time interval. Adoption of multiple forms of character, picture, voice and the like for displaying may also prevent adoption of a machine recognition manner for attacking.

In Step S301, a face of a user is positioned to ensure accuracy of video data.

Specifically, the step includes that: a facial region, particularly a mouth region, of the user is positioned by virtue of a face detection and face matching method.

In Step S202, audio data and video data returned by a user in response to the statement are acquired.

In Step S203, corresponding voice information is acquired according to the audio data.

In Step S302, whether a content of the statement is consistent with the voice information or not is judged, wherein Step S303 is executed if YES, and Step S207 is executed if NO.

Specifically, the judgment step may also be detailed as follows:

(1) a voice threshold value is preset; (2) whether consistency between the content of the statement and the voice information is higher than the voice threshold value or not is judged; (3) when the consistency is higher than the voice threshold value, it is determined that the content of the statement is consistent with the voice information; and (4) if the consistency is not higher than the voice threshold value, it is determined that the content of the statement is inconsistent with the voice information.

In Step S303, lip movement detection is performed to determine whether a lip change amplitude value is higher than a preset lip movement value or not.

Specifically, the lip movement detection may be detailed as follows:

(1) a feature of the mouth region of the user is extracted; (2) a mouth opening state and a mouth closing state are classified to generate a classification result according to the feature of the mouth region; (3) a change amplitude difference value between the mouth opening state and the mouth closing state in the classification result is calculated; (4) whether the change amplitude value is higher than a preset lip movement threshold value or not is judged; (5) when the change amplitude value is higher than the preset lip movement threshold value, the lip movement detection succeeds, and Step S204 is executed for subsequent judgment; and (6) when the change amplitude value is not higher than the preset lip movement threshold value, the lip movement detection fails, and Step S207 is executed, that is, a human face recognition failure is prompted.

In Step S204, corresponding lip movement information is acquired according to the video data.

In Step S205, whether the lip moment information and the voice information satisfy a preset rule or not is judged.

Wherein, the judgment step is specifically implemented as follows:

(1) the preset rule is set, including a fit goodness threshold value; (2) whether fit goodness between the lip movement information and the voice information is higher than the fit goodness threshold value or not is judged; and (3) when the fit goodness between the lip movement information and the voice information is higher than the fit goodness threshold value, the human face recognition request is permitted.

The fit goodness threshold value may be a percentage of an overlapped length of a voice interval and a lip movement interval in the whole video length.

In Step S206, when the lip movement information and the voice information satisfy the preset rule, the human face recognition request is permitted.

In Step S207, when the lip movement information and the voice information satisfy the preset rule, the human face recognition request is denied, that is, human face recognition fails.

Wherein, the preset fit goodness threshold value is usually 60%~90%, and is preferably about 75%. If the fit goodness threshold value is set to be excessively high, a memory may be excessively consumed in a recognition analysis step, and if it is set to be too low, an analysis result is inaccurate. Therefore, selecting a proper interval may achieve double recognition effects with half work.

According to the human face recognition method of the embodiment of the present invention, fit goodness matching is performed on the lip movement information and voice information in a video for dynamic human face recognition, so that an attack made by human face recognition with a real photo may be effectively avoided, and higher security is achieved.

In an alternative embodiment, above human face recognition method is performed at an apparatus having one or more processors and one or more memories for storing instructions to be executed by the one or more processors. The instructions, when executed by the one or more processors, cause the one or more processors to perform above method.

Embodiment 3

Figure 4:
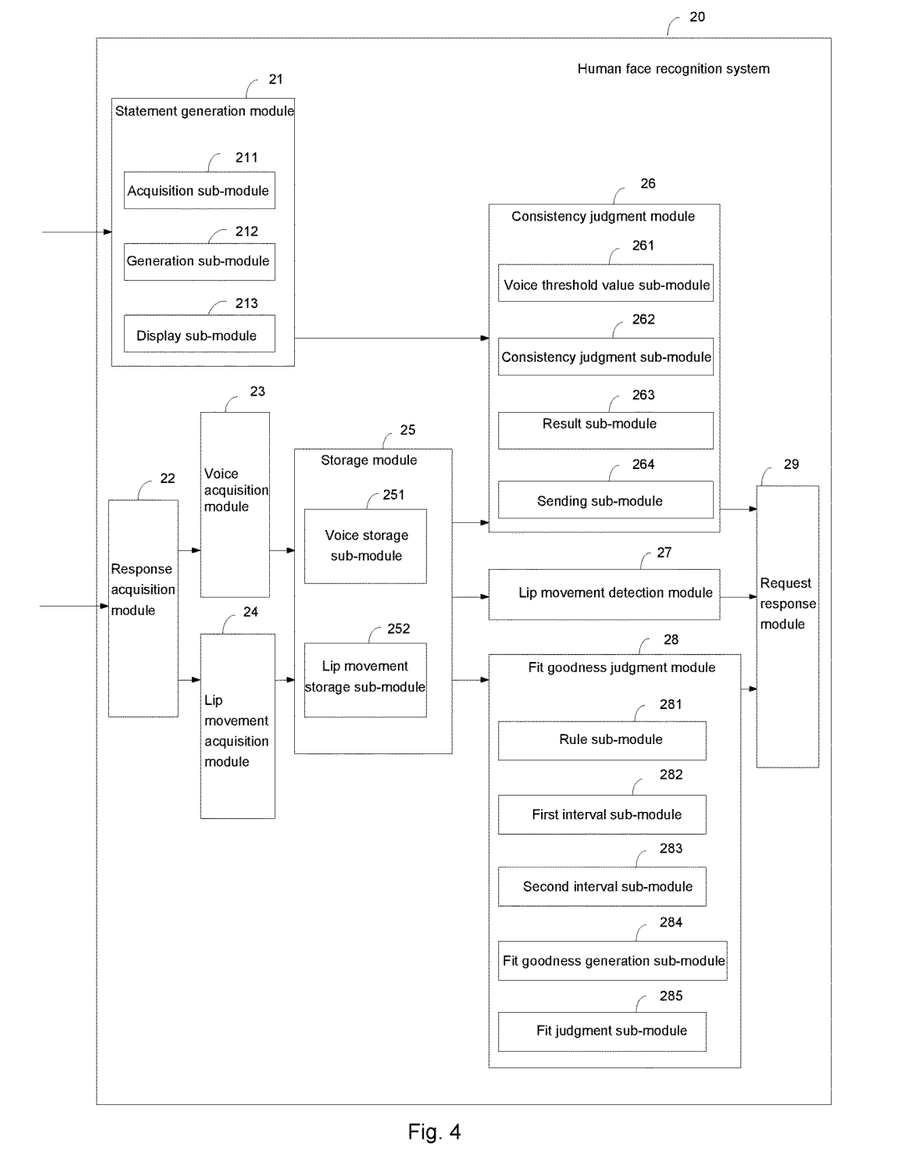
FIG. 4 is a schematic diagram of modules of a human face recognition system according to embodiment 3 of the present invention.

FIG. 4 is a schematic diagram of modules of a human face recognition system according to an embodiment of the present invention. The human face recognition system is applied to various kinds of recognition terminal devices.

The human face recognition system 20 includes: a statement generation module 21, a response acquisition module 22, a voice acquisition module 23, a lip movement acquisition module 24, a storage module 25, a consistency judgment module 26, a lip movement detection module 27, a fit goodness judgment module 28 and a request response module 29.

In an alternative embodiment, the human face recognition system 20 comprises: one or more processors; and one or more memories having instructions stored thereon, wherein the instructions, when executed by the one or more processors, cause the one or more processors to perform programming modules comprising above modules, such as, a statement generation module 21, a response acquisition module 22, a voice acquisition module 23, a lip movement acquisition module 24, a fit goodness judgment module 28 and a request response module 29.

Wherein, the statement generation module 21 is configured to acquire a human face recognition request, and randomly generate a statement according to the human face recognition request.

It can be understood that the statement generation module 21 may randomly generate the statement according to a built-in grammatical rule and may also receive the statement sent by a server.

In an embodiment, the statement generation module 21 includes an acquisition sub-module 211, a generation sub-module 212 and a display sub-module 213.

Wherein, the acquisition sub-module 211 is configured to acquire the human face recognition request. The generation sub-module 212 is configured to randomly generate, in a response to the human face recognition request, the statement on the basis of a preset statement generation rule. The display sub-module 213 is configured to display a content of the statement in a form of character, picture or voice, wherein the statement is a combination of characters, words, and/or phonetic letters.

The response acquisition module 22 is configured to acquire video data returned by a user in response to the statement.

Wherein, the response acquisition module 22 is usually a camera, including an independent or built-in camera. Triggering of the response module 22 may be triggering within a preset time after the statement is generated, and may also be active triggering of the user, for example, through a mobile phone key and an access control button. Audio data is separated from the video data by virtue of an audio and video processing tool, for example, Fast Forward Moving Picture Experts Group (FFMPEG).

The voice acquisition module 23 is configured to acquire corresponding voice information according to the audio data.

The lip movement acquisition module 24 is configured to acquire corresponding lip movement information according to the video data.

The storage module 25 is connected to the voice acquisition module 23 and the lip movement acquisition module 24, and is configured to store the audio data and the video data.

Specifically, the storage module 25 includes: a voice storage sub-module 251 and a lip movement storage sub-module 252, wherein the voice storage sub-module 251 is configured to store the voice information, and the lip movement storage sub-module 252 is configured to store the lip movement information.

The consistency judgment module 26 is configured to judge whether an acquired user voice is consistent with the content of the statement configured for recognition or not.

Specifically, the consistency judgment module 26 is connected to the storage module 25, the statement generation module 21 and the request response module 29.

The consistency judgment module 26 is configured to judge whether the content of the statement from the statement generation module 21 is consistent with the voice information from the storage module 25 or not by virtue of a voice recognition technology, and when the content of the statement is inconsistent with the voice information, send a result indicating inconsistency to the request response module 29.

The consistency judgment module 26 specifically includes: a voice threshold value sub-module 261, a consistency judgment sub-module 262, a result sub-module 263 and a sending sub-module 264.

Wherein, the voice threshold value sub-module 261 is configured to preset a voice threshold value. The consistency judgment sub-module 262 is configured to judge whether consistency between the content of the statement and the voice information is higher than the voice threshold value or not. The result sub-module 263 is configured to, when the consistency is higher than the voice threshold value, determine that the content of the statement is consistent with the voice information, and when the consistency is not higher than the voice threshold value, determine that the content of the statement is inconsistent with the voice information. The sending sub-module 264 is configured to, when the content of the statement is inconsistent with the voice information, send the result indicating inconsistency to the request response module 29.

The lip movement detection module 27 is connected to the storage module 25 and the request response module 29, and is configured to receive the lip movement information, judge whether a lip movement change amplitude is higher than a preset lip movement threshold value or not, and when the change amplitude is not higher than the lip movement threshold value, notify the request response module 29.

It can be understood that the lip movement detection module 27 may also be detailed to include: a lip movement threshold value setting sub-module, a lip movement judgment sub-module, a lip movement result sub-module and a lip movement sending sub-module, and its detailing is like the consistency judgment module 26, and thus is not marked in the figure.

Wherein, the lip movement detection module 27 may position a mouth region by virtue of a face detection and face matching method, extract a feature Histogram of Oriented Gradient (HOG) of the mouth region, and perform reliable mouth opening and mouth closing classification by virtue of a Support Vector Machine (SVM). When a maximum mouth opening and mouth closing change amplitude difference value output by the SVM is higher than the preset lip movement threshold value, it is determined that lip movement detection succeeds.

The fit goodness judgment module 28 is configured to judge whether fit goodness between the lip movement information and the voice information is higher than a fit goodness threshold value or not.

The fit goodness judgment module 28 specifically includes: a rule sub-module 281, a first interval sub-module 282, a second interval sub-module 283, a fit goodness generation sub-module 284 and a fit judgment sub-module 285.

Wherein, the rule sub-module 281 is configured to set a preset rule, and the preset rule includes the fit goodness threshold value. The first interval sub-module 282 is configured to generate a lip movement interval through the lip movement information. The second interval sub-module 283 is configured to recognize the voice to generate a voice interval by virtue of a voice recognition technology. The fit goodness generation sub-module 284 is configured to compare the lip movement interval with the voice interval to generate the fit goodness between the lip movement information and the voice information. The fit judgment sub-module 285 is configured to judge whether the fit goodness between the lip movement information and the voice information is higher than the fit goodness threshold value or not.

The request response module 29 is connected to the consistency judgment module 26, the lip movement detection module 27 and the fit goodness judgment module 28, denies the human face recognition request when a received judgment result of one of the three judgment modules is: failure, and permits the human face recognition request when judgment results of the three modules are: success.

Wherein, the request response module 29 is at least connected to the fit goodness judgment module 28, may also be selectively connected to the consistency judgment module 26 and/or the lip movement detection module 27, and may regulate a connecting relationship between the three judgment modules to maximally save time and memory.

According to the human face recognition system of the embodiment of the present invention, fit goodness matching is performed on the lip movement information and voice information in a video for dynamic human face recognition, so that an attack made by human face recognition with a real photo may be effectively avoided, and higher security is achieved.

The human face recognition method and recognition system provided by the embodiment of the present invention belong to the same concept, and details about their specific implementation processes refer to the whole specification, and will not be elaborated herein.

Embodiment 4

The embodiment of the present invention also provides a computer terminal, which may be any computer terminal device in a computer terminal group.

Optionally, in the embodiment, the computer terminal may include one or more processors, a memory and a transmission device.

Wherein, the memory may be configured to store a software program and a module, and the processor runs the software program and module stored in the memory, thereby executing various function applications and data processing, namely implementing the abovementioned human face recognition method. The memory may include a high speed random access memory, and may also be include a nonvolatile memory, such as one or more magnetic storage devices, memories or other nonvolatile solid-state memories. In some embodiments, the memory may further include memories remotely arranged relative to the processor, and these remote memories may be connected to the computer terminal through a network.

Optionally, the processor may execute program codes of the following steps in the human face recognition method:

Step S1: a human face recognition request is acquired, and a statement is randomly generated according to the human face recognition request;

Step S2: audio data and video data returned by a user in response to the statement are acquired;

Step S3: corresponding voice information is acquired according to the audio data;

Step S4: corresponding lip movement information is acquired according to the video data; and Step S5: when the lip movement information and the voice information satisfy a preset rule, the human face recognition request is permitted.

Optionally, the processor may also execute program codes of the following steps in the human face recognition method: the step that the human face recognition request is permitted when the lip movement information and the voice information satisfy the preset rule specifically includes that: the preset rule is set, including a fit goodness threshold value; whether fit goodness between the lip movement information and the voice information is higher than a fit goodness threshold value or not is judged; and when the fit goodness between the lip movement information and the voice information is higher than the fit goodness threshold value, the human face recognition request is permitted.

Optionally, the processor may also execute a program code of the following step in the human face recognition method: whether a content of the state is consistent with the voice information or not is judged after the corresponding voice information is acquired according to the audio data, wherein the step that the fit goodness between the lip movement information and the voice information is higher than the fit goodness threshold value or not is judged is executed if the content of the statement is consistent with the voice information; or it is prompted that the human face recognition request is not permitted if the content of the statement is inconsistent with the voice information.

Optionally, the processor may also execute program codes of the following steps in the human face recognition method: the step that whether the content of the statement is consistent with the voice information or not is judged specifically includes that: a voice threshold value is preset; whether consistency between the content of the statement and the voice information is higher than the voice threshold value or not is judged; when the consistency is higher than the voice threshold value, it is determined that the content of the statement is consistent with the voice information; or when the consistency is not higher than the voice threshold value, it is determined that the content of the statement is inconsistent with the voice information.

Optionally, the processor may also execute program codes of the following steps in the human face recognition method: the step that the human face recognition request is acquired and the statement is randomly generated according to the human face recognition request specifically includes that: the human face recognition request is acquired; a response is given to the human face recognition request to randomly generate the statement on the basis of a preset statement generation rule; and the content of the statement is displayed in a form of character, picture or voice, wherein the statement is a combination of characters, words, and/or phonetic letters.

Optionally, the processor may also execute program codes of the following steps in the human face recognition method: before the human face recognition request is permitted when the lip movement information and the voice information satisfy the preset rule, the method also includes that: a lip movement interval is generated based on the lip movement information; the voice is recognized to generate a voice interval by virtue of a voice recognition technology; the lip movement interval is compared with the voice interval to generate the fit goodness between the lip movement information and the voice information; and whether the fit goodness is consistent with the preset rule or not is judged.

Optionally, the processor may also execute program codes of the following steps in the human face recognition method: before the human face recognition request is permitted when the lip movement information and the voice information satisfy the preset rule, the method also includes that: a mouth region of the user is positioned by virtue of a face detection and face matching method; a feature of the mouth region is extracted; a mouth opening state and a mouth closing state are classified to generate a classification result according to the feature of the mouth region; whether a change amplitude difference value between the mouth opening state and the mouth closing state is higher than a preset lip movement threshold value or not is judged; when the change amplitude value is higher than the preset lip movement threshold value, lip movement detection succeeds, and the step that whether the fit goodness between the lip movement information and the voice information is higher than the fit goodness threshold value or not is judged is executed; or when the change amplitude value is not higher than the preset lip movement threshold value, lip movement detection fails, and a prompt about a human face recognition failure is generated.

Those skilled in the art should know that the computer terminal may also be a terminal device such as an intelligent mobile phone (such as an Android mobile phone and an iOS mobile phone), a tablet computer, a palm computer and a Mobile Internet device (MID) and a PAD.

Those skilled in the art should know that all or part of the steps in the various methods of the abovementioned embodiments may be implemented by instructing related hardware of a terminal device by a program, the program may be stored in a computer-readable storage medium, and the storage medium may include: a flash disk, a Read-Only Memory (ROM), a Random Access Memory (RAM), a magnetic disk, an optical disk or the like.

Embodiment 5

The embodiment of the present invention also provides a storage medium. Optionally, in the embodiment, the storage medium may be configured to store program codes executed by a human face recognition method provided by embodiment 1.

Optionally, in the embodiment, the storage medium may be positioned in any computer terminal in a computer terminal group in a computer network, or positioned in any mobile terminal in a mobile terminal group.

Optionally, in the embodiment, the storage medium is configured to store program codes configured to execute the following steps:

Step S6: a human face recognition request is acquired, and a statement is randomly generated according to the human face recognition request;

Step S7: audio data and video data returned by a user in response to the statement are acquired;

Step S8: corresponding voice information is acquired according to the audio data;

Step S9: corresponding lip movement information is acquired according to the video data; and Step S10: when the lip movement information and the voice information satisfy a preset rule, the human face recognition request is permitted.

Optionally, in the embodiment, the storage medium is configured to store program codes configured to execute the following steps:

the step that the human face recognition request is permitted when the lip movement information and the voice information satisfy the preset rule specifically includes that: the preset rule is set, including a fit goodness threshold value; whether fit goodness between the lip movement information and the voice information is higher than a fit goodness threshold value or not is judged; and when the fit goodness between the lip movement information and the voice information is higher than the fit goodness threshold value, the human face recognition request is permitted.

Optionally, in the embodiment, the storage medium is configured to store a program code configured to execute the following step:

whether a content of the statement is consistent with the voice information or not is judged after the corresponding voice information is acquired according to the audio data, wherein the step that the fit goodness between the lip movement information and the voice information is higher than the fit goodness threshold value or not is judged is executed if the content of the statement is consistent with the voice information; or it is prompted that the human face recognition request is not permitted if the content of the statement is inconsistent with the voice information.

Optionally, in the embodiment, the storage medium is configured to store program codes configured to execute the following steps: the step that whether the content of the statement is consistent with the voice information or not is judged specifically includes that: a voice threshold value is preset; whether consistency between the content of the statement and the voice information is higher than the voice threshold value or not is judged; when the consistency is higher than the voice threshold value, it is determined that the content of the statement is consistent with the voice information; or when the consistency is not higher than the voice threshold value, it is determined that the content of the statement is inconsistent with the voice information.

Optionally, in the embodiment, the storage medium is configured to store program codes configured to execute the following steps:

the step that the human face recognition request is acquired and the statement is randomly generated according to the human face recognition request specifically includes that: the human face recognition request is acquired; a response is given to the human face recognition request to randomly generate the statement on the basis of a preset statement generation rule; and the content of the statement is displayed in a form of character, picture or voice, wherein the statement is a combination of characters, words, and/or phonetic letters.

Optionally, in the embodiment, the storage medium is configured to store program codes configured to execute the following steps: before the human face recognition request is permitted when the lip movement information and the voice information satisfy the preset rule, the method also includes that: a lip movement interval is generated based on the lip movement information; the voice is recognized to generate a voice interval by virtue of a voice recognition technology; the lip movement interval is compared with the voice interval to generate the fit goodness between the lip movement information and the voice information; and whether the fit goodness is consistent with the preset rule or not is judged.

Optionally, in the embodiment, the storage medium is configured to store program codes configured to execute the following steps: before the human face recognition request is permitted when the lip movement information and the voice information satisfy the preset rule, the method also includes that: a mouth region of the user is positioned by virtue of a face detection and face matching method; a feature of the mouth region is extracted; a mouth opening state and a mouth closing state are classified to generate a classification result according to the feature of the mouth region; whether a change amplitude difference value between the mouth opening state and the mouth closing state is higher than a preset lip movement threshold value or not is judged; when the change amplitude value is higher than the preset lip movement threshold value, lip movement detection succeeds, and the step that whether the fit goodness between the lip movement information and the voice information is higher than the fit goodness threshold value or not is judged is executed; or when the change amplitude value is not higher than the preset lip movement threshold value, lip movement detection fails, and a prompt about a human face recognition failure is generated.

From the above, although the invention has been disclosed above with preferred embodiments, the abovementioned preferred embodiments are not intended to limit the invention, and those skilled in the art may make various modifications and embellishments without departing from the spirit and scope of the invention. Therefore, the scope of protection of the invention is subject to the scope defined by the claims.

What is claimed is:

1. A human face recognition method performed at an apparatus having one or more processors and one or more memories for storing instructions to be executed by the one or more processors, wherein the method comprises:
    acquiring a human face recognition request, and randomly generating a statement according to the human face recognition request;
    acquiring audio data and video data returned by a user in response to the statement;
    acquiring voice information corresponding to the audio data;
    judging whether a content of the statement is consistent with the voice information;
    in response to judging that the content of the statement is inconsistent with the voice information, prompting that the human face recognition request is not permitted; and
    in response to judging that the content of the statement is consistent with the voice information;
        acquiring lip movement information corresponding to the video data;
        judging whether a fit goodness between the lip movement information and the voice information is higher than a fit goodness threshold value;
        in response to judging that the fit goodness is not higher than the fit goodness threshold value, prompting that the human face recognition request is not permitted; and
        in response to judging that the fit goodness is higher than the fit goodness threshold value, permitting the human face recognition request.

2. The human face recognition method according to claim 1, wherein the judging whether the content of the statement is consistent with the voice information comprises:
    presetting a voice threshold value;
    judging whether consistency between the content of the statement and the voice information is higher than the voice threshold value;
    in response to judging that the consistency is higher than the voice threshold value, judging that the content of the statement is consistent with the voice information; and
    in response to judging that the consistency is not higher than the voice threshold value, judging that the content of the statement is inconsistent with the voice information.

3. The human face recognition method according to claim 1, wherein the acquiring the human face recognition request and randomly generating the statement according to the human face recognition request comprises:
    acquiring the human face recognition request;
    randomly generating, in response to the human face recognition request, the statement on the basis of a preset statement generation rule; and
    displaying the content of the statement in a form of character, picture or voice, wherein the statement is a combination of characters, words, and/or phonetic letters.

4. The human face recognition method according to claim 1, further comprising:
    generating a lip movement interval based on the lip movement information;
    recognizing the voice information to generate a voice interval by virtue of a voice recognition technology; and
    comparing the lip movement interval with the voice interval to generate the fit goodness between the lip movement information and the voice information.

5. The human face recognition method according to claim 1, further comprising:
    judging whether a lip movement change amplitude is higher than a preset lip movement threshold value;
    in response to judging that the lip movement change amplitude is higher than the preset lip movement threshold value, determining that lip movement detection succeeds, and executing the step of judging whether the fit goodness between the lip movement information and the voice information is higher than the fit goodness threshold value; and
    in response to judging that the lip movement change amplitude is not higher than the preset lip movement threshold value, determining that lip movement detection fails, and prompting that the human face recognition request is not permitted.

6. The human face recognition method according to claim 5, further comprising:
    positioning a mouth region of the user by virtue of a face detection and face matching method;
    extracting a feature of the mouth region;
    classifying a mouth opening state and a mouth closing state according to the feature of the mouth region; and
    determining a change amplitude difference value between the mouth opening state and the mouth closing state as the lip movement change amplitude.

7. A human face recognition system, wherein the system comprises:
    one or more processors; and
    one or more memories having instructions stored thereon, wherein the instructions, when executed by the one or more processors, cause the one or more processors to perform:
    acquiring a human face recognition request, and randomly generating a statement according to the human face recognition request;
    acquiring audio data and video data returned by a user in response to the statement;
    acquiring voice information corresponding to the audio data;
    judging whether a content of the statement is consistent with the voice information;
    in response to judging that the content of the statement is inconsistent with the voice information, prompting that the human face recognition request is not permitted; and
    in response to judging that the content of the statement is consistent with the voice information;
        acquiring lip movement information corresponding to the video data;
        judging whether a fit goodness between the lip movement information and the voice information is higher than a fit goodness threshold value;
        in response to judging that the fit goodness is not higher than the fit goodness threshold value, prompting that the human face recognition request is not permitted; and in response to judging that the fit goodness is higher than the fit goodness threshold value, permitting the human face recognition request.

8. The human face recognition system according to claim 7, wherein the one or more processors are further configured to perform:
presetting a voice threshold value;
judging whether consistency between the content of the statement and the voice information is higher than the voice threshold value;
in response to judging that the consistency is not higher than the voice threshold value, judging that the content of the statement is inconsistent with the voice information; and
in response to judging that the consistency is higher than the voice threshold value, judging that the content of the statement is consistent with the voice information.

9. The human face recognition system according to claim 7, wherein the one or more processors are further configured to perform:
acquiring the human face recognition request;
randomly generating, in response to the human face recognition request, the statement on the basis of a preset statement generation rule; and
displaying the content of the statement in a form of character, picture or voice, wherein the statement is a combination of characters, words, and/or phonetic letters.

10. The human face recognition system according to claim 7, wherein the one or more processors are further configured to perform:
generating a lip movement interval based on the lip movement information;
recognizing the voice information to generate a voice interval by virtue of a voice recognition technology; and
comparing the lip movement interval with the voice interval to generate the fit goodness between the lip movement information and the voice information.

11. The human face recognition system according to claim 7, wherein the one or more processors are further configured to perform:
judging whether a lip movement change amplitude is higher than a preset lip movement threshold value;
in response to judging that the lip movement change amplitude is higher than the preset lip movement threshold value, determining that lip movement detection succeeds, and performing the step of judging whether the fit goodness between the lip movement information and the voice information is higher than the fit goodness threshold value; and
in response to judging that the lip movement change amplitude is not higher than the lip movement threshold value, determining that lip movement detection fails and prompting that the human face recognition request is not permitted.

12. The human face recognition system according to claim 11, wherein the one or more processors are further configured to perform:
positioning a mouth region of the user by virtue of a face detection and face matching method;
extracting a feature of the mouth region;
classifying a mouth opening state and a mouth closing state according to the feature of the mouth region; and
determining a change amplitude difference value between the mouth opening state and the mouth closing state as the lip movement change amplitude.

13. A non-transitory computer readable storage medium storing instructions, the instructions, when being executed by a processor, cause the processor to perform:
acquiring a human face recognition request, and randomly generating a statement according to the human face recognition request;
acquiring audio data and video data returned by a user in response to the statement;
acquiring voice information corresponding to the audio data;
judging whether a content of the statement is consistent with the voice information;
in response to judging that the content of the statement is inconsistent with the voice information, prompting that the human face recognition request is not permitted; and
in response to judging that the content of the statement is consistent with the voice information;
acquiring lip movement information corresponding to the video data;
judging whether a fit goodness between the lip movement information and the voice information is higher than a fit goodness threshold value;
in response to judging that the fit goodness is not higher than the fit goodness threshold value, prompting that the human face recognition request is not permitted; and
in response to judging that the fit goodness is higher than the fit goodness threshold value, permitting the human face recognition request.

14. The storage medium according to claim 13, wherein the judging whether the content of the statement is consistent with the voice information comprises:
presetting a voice threshold value;
judging whether consistency between the content of the statement and the voice information is higher than the voice threshold value;
in response to judging that the consistency is higher than the voice threshold value, judging that the content of the statement is consistent with the voice information; and
in response to judging that the consistency is not higher than the voice threshold value, judging that the content of the statement is inconsistent with the voice information.

15. The storage medium according to claim 13, wherein the acquiring the human face recognition request and randomly generating the statement according to the human face recognition request comprises:
acquiring the human face recognition request;
randomly generating, in response to the human face recognition request, the statement on the basis of a preset statement generation rule; and
displaying the content of the statement in a form of character, picture or voice, wherein the statement is a combination of characters, words, and/or phonetic letters.

16. The storage medium according to claim 13, further comprising:
generating a lip movement interval based on the lip movement information;
recognizing the voice information to generate a voice interval by virtue of a voice recognition technology; and
comparing the lip movement interval with the voice interval to generate the fit goodness between the lip movement information and the voice information.

17. The storage medium according to claim 13, wherein the instructions further cause the processor to perform:
- judging whether a lip movement change amplitude is higher than a preset lip movement threshold value;
- in response to judging that the lip movement change amplitude is higher than the preset lip movement threshold value, determining that lip movement detection succeeds, and executing the step of judging the fit goodness between the lip movement information and the voice information; and
- in response to judging that the lip movement change amplitude is not higher than the preset lip movement threshold value, determining that lip movement detection fails, and prompting that the human face recognition request is not permitted.

18. The storage medium according to claim 17, wherein the instructions further cause the processor to perform:
- positioning a mouth region of the user by virtue of a face detection and face matching method;
- extracting a feature of the mouth region;
- classifying a mouth opening state and a mouth closing state according to the feature of the mouth region; and
- determining a change amplitude difference value between the mouth opening state and the mouth closing state as the lip movement change amplitude.

* * * * *